Sept. 26, 1933.  W. H. SILVER  1,928,320
LISTER CULTIVATOR
Original Filed Oct. 24, 1927   2 Sheets-Sheet 2
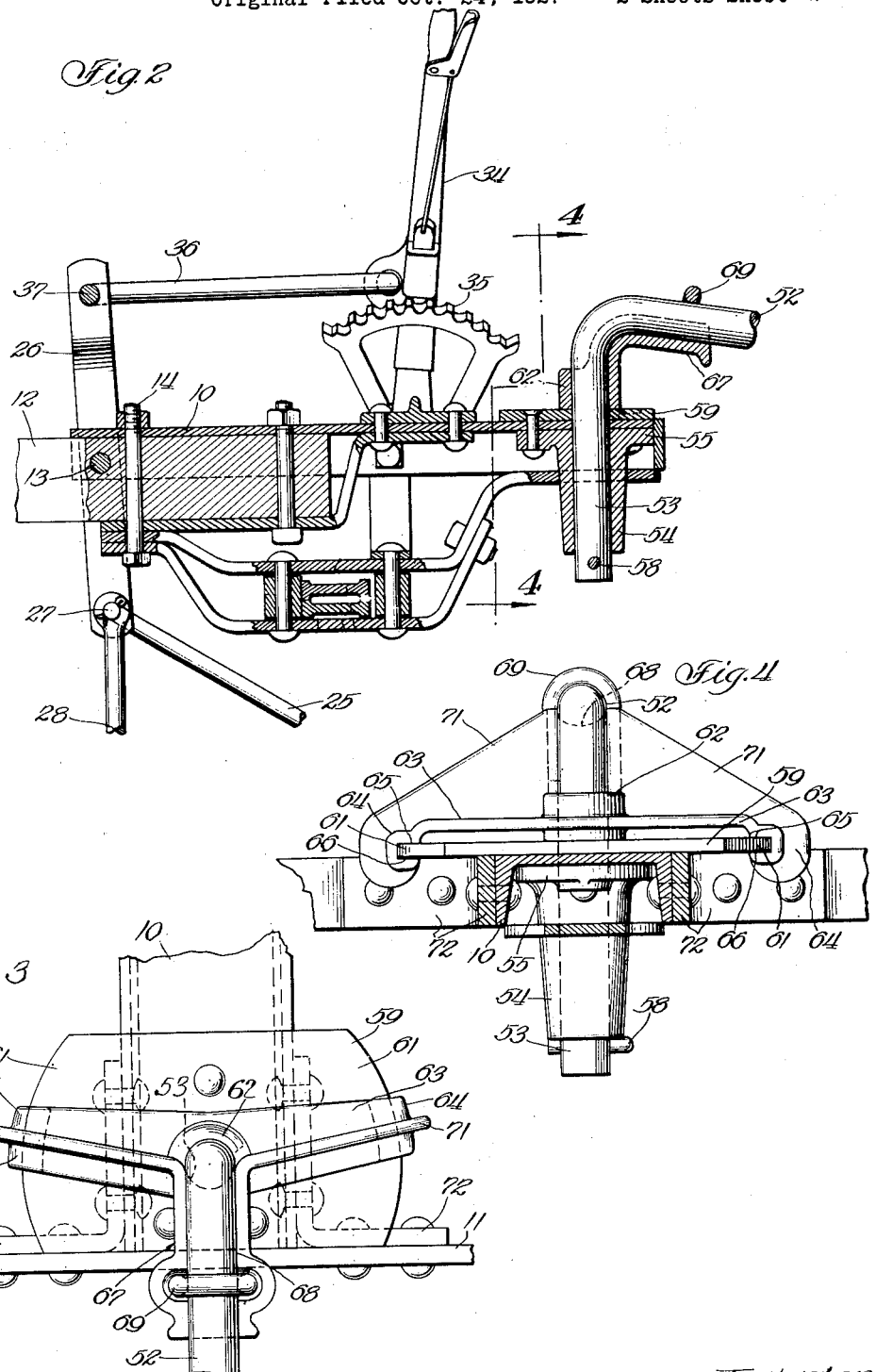

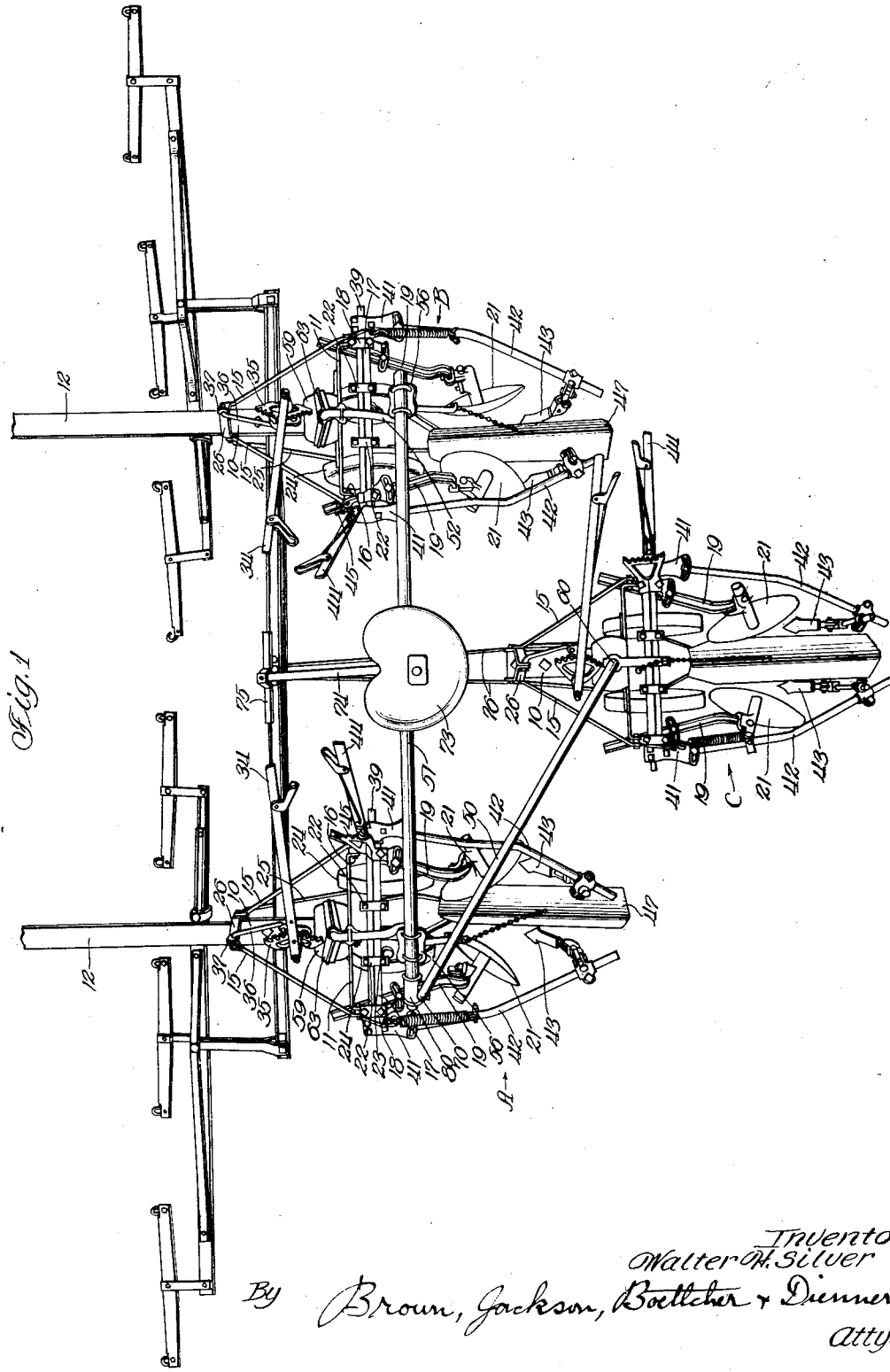

Patented Sept. 26, 1933

1,928,320

UNITED STATES PATENT OFFICE 1,928,320

LISTER CULTIVATOR

Walter H. Silver, Moline, Ill., assignor to Deere & Company, Moline, Ill., a corporation of Illinois Original application October 24, 1927, Serial No. 228,118. Divided and this application November 5, 1931. Serial No. 573,073

24 Claims. (Cl. 97—143)

The present invention relates to lister cultivators and is a division of my copending application, Serial No. 228,118, filed October 24, 1927. In my copending application the cultivator there illustrated is of the type which can be readily adapted alternatively to either four-horse or six-horse draft. Such feature is of considerable advantage in that it enables one standard size of implement to be sold either as a four-horse or six-horse implement, and it also enables the farmer to convert the implement readily into either a four- or six-horse device in accordance with different soil conditions or the number of head of horses available.

In a copending application filed by myself, Theophilus Brown and Carl G. Strandlund, which application is identified as Serial No. 228,142, filed October 24, 1927, we have disclosed a three-row lister cultivator which includes among other features: The arrangement of the three cultivator gangs so that each can shift laterally independently of each other in order that the gangs can accurately follow the lateral deviations in the plant rows; the disposal of the three cultivator gangs in staggered relation to prevent the gangs interfering or colliding with each other in their laterally deviating travel, or in the turning of the implement at the ends of the field; and the provision of improved stabilizing means for preventing lateral tipping of any of the gangs.

The present invention has been devised primarily for embodiment in an implement having the above characteristic features, and contemplates an improved construction of bearing for establishing the pivotal connection between each outer gang and its associated stabilizing link or arm. Such link or arm resists the tendency of the cultivator gang to tip laterally, and the present bearing affords bearing points of wide radial spacing for better resisting this tipping tendency.

Other objects and advantages of the invention will appear at length in the following description of a preferred embodiment thereof. In the drawings illustrating such embodiment:

Fig. 1 is a plan view in perspective of the complete implement in which the present invention is preferably embodied;

Fig. 2 is a longitudinal sectional view through the front end of one of the outer gangs;

Fig. 3 is a detail plan view illustrating the bearing which connects each outer gang with its stabilizing arm or link; and Fig. 4 is a sectional view of the same, corresponding to a section taken on the plane of the line 4—4 of Fig. 2.

The implement comprises three lister cultivator gangs, the two outwardly-disposed gangs being designated A and B, and the intermediate or center gang being designated C. The two laterally-disposed gangs A and B are substantial duplicates, with the exception that one is a left hand unit and the other a right hand unit. The intermediate gang C is similar in construction to the two outer gangs A and B, only differing therefrom in the manner of establishing the draft connection with the intermediate gang, and in the fact that such intermediate gang has no draft pole, as will hereinafter appear. Accordingly, I shall only describe one of these gangs in detail, and in this regard, attention is directed to the fact that these gangs correspond in their general construction to the gangs illustrated in Patent No. 1,148,613, issued to W. A. Paul on August 3, 1915. These gangs also correspond to the construction of gangs or units disclosed in the copending applications above referred to.

Referring specifically to the gang or unit A, it will be noted that it comprises a frame which is built up of a longitudinally extending channel bar 10 and a transversely extending bar 11 at the rear end thereof. The transverse bar 11 extends across the rear end of the inverted channel bar 10 and is rigidly secured thereto by angle brackets or in any other suitable manner. Extending forwardly from the front end of the channel bar 10 is a draft pole 12, the channel bar 10 forming a socket in which the pole is rigidly secured by a horizontally extending bolt 13 (Fig. 2), which passes through the side flanges of the channel bar and through the tongue, and also by a vertical bolt 14 which passes downwardly through the web of the channel 10 and through the tongue. It will be understood that the other gang unit B also has a draft pole 12 extending forwardly therefrom, which is connected to its channel bar 10 in the same manner. The forementioned frame consisting of the channel bar 10 and transverse bar 11 is braced by diagonally extending brace bars or rods 15 (Fig. 1) which are connected at their forward ends to the horizontally extending bolt 13. The rear ends of these diagonal brace bars are bent rearwardly and are provided with openings to receive bolts 16 which connect the ends of the bars 11 and 15.

The bolts 16 also constitute pivots on which a tool carrying frame is pivotally mounted. Such tool carrying frame comprises primarily a tubular bar 17, preferably of square cross-section. Secured to the opposite ends of such bar are clamp devices or bracket members 18 which are clamped to the outer surface of the bar and which have forwardly extending pivot eyes having pivotal mounting on the bolts 16. Thus the tool carrying bar 17 and the frame 10—11 are capable of vertical pivotal movement relative to each other about the axis of the bolts 16. Pivotally connected to the under sides of the two brackets 18, for horizontal swinging movement, are rearwardly extending arms 19 which carry suitable earth working tools at their rear ends. In the arrangement shown, I have illustrated discs 21 as being mounted on the arms 19, but it will be evident that shovels or any other desired type of earth working devices may be mounted on these arms in lieu of the discs 21. The arms 19 are adapted to be swung inwardly or outwardly to vary the distance between the earth working tools carried thereby, and to be clamped in any adjusted position by a suitable arrangement of clamping bolt engaging in a curved slot in the bracket 18, the details of which need not be described as they are old and well-known. It will also be understood that the earth working tools can be set at different angles with respect to their supporting arms 19.

Secured in spaced relation to the intermediate portion of the tubular bar 17 are two clamping devices 22 from which depend vertical standards 23 (Fig. 1). The lower ends of these two standards have outwardly extending axle spindles upon which are journaled bell wheels 24—24, which straddle the plant row and which support the tool carrying bar 17. Connected to the wheel carrying standards 23, at points preferably adjacent to the outwardly extending spindle portions, are links 25 (best shown in Fig. 2) which extend upwardly and forwardly to a pivoted yoke 26. Such yoke comprises two spaced straps 26 which extend down on the opposite sides of the channel bar 10, being pivotally connected thereto by the bolt 13 which extends through both straps 26. Said straps extend down below the channel bar 10 and have their lower ends apertured to receive the ends of the links 25, such links having inwardly turned ends 27 which project through the apertures in the straps from the outer sides of the straps. Pivotally mounted upon such inwardly turned ends, between the straps 26, is a clevis 28. The doubletrees or tripletrees, depending on whether a four-horse hitch or a six-horse hitch is employed, are pivotally connected to the clevis 28, as more clearly explained in the application above identified of which this is a division.

The draft pull which is effective on each clevis 28 is prevented from swinging the yoke 26, through an adjustable locking relation which is established between said yoke and the frame bar 10 of the cultivator gang. Such locking relation is afforded by a lever 34 which is pivotally supported on a suitable pivot bracket mounted on the upper side of the channel bar 10. The lever carries any suitable latch mechanism adapted to cooperate with a latching sector 35, which sector is formed as part of the pivot bracket on which the lever is mounted. A link 36 is pivotally connected to said lever and extends forwardly for effecting pivotal connection at 37 with the upper end of the yoke 26. The upper ends of the two straps which form said yoke are brought together, and the laterally bent end 37 of the link 36 is passed through openings in the upper ends of the straps. It will be evident that by shifting the lever 34 fore and aft the yoke 26 will be rocked on the bolt 13 as a pivot, which will shift the links 25 and thus swing the bell wheels fore and aft about the pivot bolts 16, thereby rocking the tubular frame bar 17 to swing the cultivating devices 21 into or out of engagement with the ground.

Extending through the tubular bar or shaft 17, and rotatable therein, is a second tool carrying shaft 39. Rigidly clamped to the outer ends of the shaft 39 are brackets 41 from which extend bars or arms 42. The rear ends of such arms 42 carry suitable earth working tools 43 which, in the illustrated arrangement, consist of shovels, although it will be evident that any other desired type of cultivating devices may be mounted on these arms. Provision is made for adjusting the two arms 42 of each gang inwardly or outwardly with respect to the plant row, such adjustments being secured by a suitable clamping bolt carried by each arm which effects clamping engagement in a curved slot in the associated bracket 41. These adjustments correspond more or less to the adjustments provided for in the case of the arms 19, and need not be described in detail as they are old and well-known.

The second set of cultivating devices, just described, may be given different depth adjustments relative to the first set of cultivating devices 21 through actuation of a lever 44. This lever is fixedly secured to the tool carrying shaft 39, on which the brackets 41 are mounted, and is adapted to have latched engagement with a notched sector 45 which is illustrated as constituting a part of the inner clamping bracket 18. As previously described, such clamping bracket is secured fast to the outer tubular shaft or bar 17, and hence the latched engagement of the lever 44 with the sector 45 will hold the two shafts 17 and 39 in fixed relation to each other. It will be seen from the foregoing that when the lever 34 is actuated, the wheel support, comprising the bell wheels 24 and their standards 23, will be shifted fore and aft, and in such movement will raise or lower both sets of cultivating devices 21 and 43, which cutivating devices are carried by the wheel support. It will also be seen that by moving the second lever 44 fore and aft an independent depth adjustment can be given the second set of cultivating devices 43, or these cultivating devices can be raised and lowered for the purpose of shaking trash out of the shovels 43.

Disposed between the two supporting wheels of each gang or cultivator unit is a shield 47 which travels along in the bottom of the trench, over the young plants, so as to prevent the plants from being covered by the soil or otherwise injured in the cultivating operation. Such shield consists of an inverted angle shaped member, which has any suitable draft connection at its forward end with the cultivator unit.

The stabilizing means for the two outer cultivator units A and B comprises a transversely extending bar 51 which has pivotal connection with the cultivator units through forwardly extending stabilizing arms 52. The front ends of the arms 52 have bearing support in the cultivator units A and B, in a manner which I shall hereinafter describe, and the rear ends of such arms are provided with upwardly extending bearing sockets (not shown) in which are swiveled clamping devices, indicated generally at 56. Each of such clamping devices comprises any suitable arrangement of cooperating clamping parts which rigidly engage around the end portion of the transverse stabilizing bar 51. The pivotal connection between each clamping device 56 and its arm 52 permits pivotal movement between said arm and the stabilizing bar when one or the other of the cultivator units swings inwardly or outwardly in following its lister row.

Referring to Fig. 2, the front end of each stabilizing arm 52 has a downwardly extending stem or bearing portion 53 which engages in a bearing socket 54 secured to the rear end of the channel shaped frame bar 10. Such bearing socket is preferably in the form of a depending sleeve serving as a journal means for the downwardly turned portion 53 of the stabilizing arm 52. The sleeve or bearing socket 54 is also shown as having a flange 55 at its upper end which is secured to the under side of the frame bar 10. Such frame bar has an opening through which the bearing portion 53 extends in passing down through the bearing socket 54, and a pin 58 is passed transversely through the lower end of the bearing portion 53 to prevent upward displacement of the stabilizing arm from the bearing socket. The length of the bearing socket 54 affords a staunch pivotal support between the stabilizing arm and the frame of the cultivator unit, such being desirable because this pivotal support must resist the lateral tipping tendencies of the cultivator unit. Such pivotal support is additionally reenforced above the channel bar 10 by the cooperating bearing parts or members which I shall now describe.

Secured to the upper side of the channel bar 10 is a bearing plate member 59 which is centrally apertured to permit the bearing portion 53 to pass down therethrough. As shown in Figs. 3 and 4, such plate has its lateral edges 61 curved on arcs having the pivot axis of the bearing portion 53 as their center. Mounted on such bearing portion 53 above this plate is a cooperating bearing element or member in the form of a collar 62, such collar resting at its lower end on the plate 59. Extending radially from collar 62 are bearing arms 63 which have hook-like ends 64 embracing the curved edges 61 of the plate 59. The extremity of each bearing arm 63 bears against the upper side of the plate 59, as indicated at 65, and also bears against the lower side of such plate, as indicated at 66. These hook-like portions 64 also serve in addition to the pin 58, to prevent upward displacement of the stabilizing arm from its bearing socket on the cultivator unit, thus maintaining the two bearing members 59 and 62 in cooperative relation Extending rearwardly from the collar 62, and preferably at an elevated point above the bearing arm 63, is a clamping arm 67 in the upper side of which a longitudinal groove 68 is formed. The rearwardly extending portion of the stabilizing arm 52 engages in said groove, and is clamped therein by a U-bolt 69 which embraces the stabilizing arm and has its ends passing down through holes in the side portions of the clamping arm 67. The bearing arms 63 and the clamping arm 67 are reenforced by vertical ribs 71 which extend between these arms.

It will be observed that the bearing plate 59 and bearing arms 63 supplement the bearing socket 54 in affording a staunch pivotal support which will resist the twisting stresses set up between the stabilizing arm and the cultivator unit, incident to any tipping tendency of the cultivator unit. The bearing surfaces 65 and 66 at the outer ends of both bearing arms 63, by virtue of being disposed at right angles to the pivot axis of the bearing and being spaced radially at a considerable distance from said axis, are very effective for resisting the twisting stresses incident to holding the cultivator unit against tipping. It will be noted that the bearing arms 63 also function as stops for limiting the lateral swinging movement of the stabilizing arm 52, such occurring when these bearing arms strike the angle brackets 72 which join the channel bar 10 with the transverse frame bar 11.

The stabilizing bar 51, in cross-connecting the two stabilizing arms 52 in the manner described, prevents either of these arms from twisting or tipping laterally about a longitudinal axis relative to its individual gang, and hence the arms and stabilizing bar hold the two gangs A and B against lateral tipping while still permitting said gangs to shift inwardly or outwardly in following their lister rows. Secured to the intermediate portion of the stabilizing bar 51 is the operator's seat 73, from which position the operator can conveniently reach the levers 34 and 44 of the three gangs. A bar 74 extends forwardly from the stabilizing bar 51, below the seat 73, and carries a foot rest 75 at its forward end. The seat 73 and foot rest 75 swing from side to side as a unit with the stabilizing bar 51 in any transverse shifting movement of said bar.

The arrangement of the two outer cultivator units A and B, and the general form of stabilizing connection between these units corresponds in general to a conventional two-row lister cultivator. Referring now to the operative association and connection of the intermediate cultivator gang C with the two outer gangs A and B, it will be seen from Fig. 1 that the intermediate gang is disposed considerably in rear of the transverse plane of the two outer gangs. Such location of the intermediate gang permits all three gangs to swing laterally in following the deviations in the plant rows without interference between the gangs; and also permits the implement to be turned at the ends of the field without the gangs colliding with each other in such turning movement. As previously remarked, the intermediate gang is in all material respects a duplicate of the outer gangs A and B, only differing therefrom in its draft connections. Referring to Fig. 1, such intermediate gang is provided with a pair of spaced draft members 76 which are pivotally connected to the lower ends of the yoke straps 26. The members 76 extend rearwardly beyond the yoke 26 and have pivotal connection with links (not shown) which extend down from the frame bar 10, which links, together with the yoke 26, afford a parallel link pivotal connection between the draft member 76 and the frame bar 10 of the intermediate unit. Such pivotal connection between the draft member 76 and the intermediate unit is illustrated and described in the second mentioned copending application above referred to.

The stabilizing means for this intermediate gang comprises a stabilizing bar or link 50 which extends diagonally forwardly from the intermediate unit to one end of the transverse stabilizing bar 51. The rear end of the diagonal stabilizing bar 50 has a downwardly extending bearing portion 60 which extends down into the vertical bearing socket 54 of the intermediate unit. The front end of the stabilizing bar 50 has a downwardly extending bearing portion 70 which has bearing engagement in a vertical bearing socket formed in a bracket 80 which is secured to the end of the transverse stabilizing bar 51. Thus the diagonal stabilizing bar 50 will hold the intermediate unit C against lateral tipping, without interfering with lateral shifting movement of such unit, such as is desirable in order that the unit be free to follow its lister row. In such lateral movement, the transverse stabilizing bar 51 will be shifted endwise to one side or the other on its freely swinging stabilizing arms 52.

For other details reference may be had to my above identified application of which this is a division.

What I claim as my invention and desire to secure by Letters Patent is:

1. In a lister cultivator, the combination of a cultivator unit and stabilizing means therefor comprising a stabilizing bar, an arm movably connected with said bar, bearing means movably connecting said arm with said unit and comprising two relatively movable members having cooperating bearing surfaces spaced apart in the plane of movement, one movable with said unit and the other movable with said arm, said surfaces extending in angular relation to the axis of movement of said arm relative to said unit, and means maintaining said bearing members in cooperating relation.

2. In a lister cultivator, the combination of a cultivator unit and stabilizing means therefor to prevent tilting of the cultivator unit, comprising a transverse stabilizing bar, an arm journaled for movement about a pivot axis on said bar, bearing means pivotally connecting said arm with said unit for movement about a second pivot axis, said bearing means consisting of two relatively movable members having cooperating bearing surfaces spaced a substantial distance from said second pivot axis, one of said bearing members movable with said unit and the other movable with said arm, and means for maintaining said bearing members in cooperative relation.

3. In a lister cultivator, the combination of a cultivator unit and stabilizing means to prevent tilting of the latter, said stabilizing means comprising a stabilizing bar extending transversely with respect to said unit, an arm movably connected with said bar, bearing means pivotally connecting said arm with said unit for relative movement about the pivot axis, said bearing means comprising flat movable members having cooperating bearing surfaces extending substantially perpendicularly to said pivot axis, one of said members being movable with said cultivator unit while the other is movable with said arm, and means for maintaining said bearing members in cooperative relation.

4. In a lister cultivator, the combination of a cultivator unit and stabilizing means therefor comprising a stabilizing bar, an arm pivotally connected with said bar, bearing means pivotally connecting said arm with said unit for movement about a pivot axis, said bearing means including two flat relatively movable members having cooperating bearing surfaces, one movable with said unit and the other movable with said arm, and means carried by one of said members and engaging over the edge of the other member for maintaining the bearing members in cooperative relation.

5. In a multiple row lister cultivator, the combination of two lister cultivator units, stabilizing means connecting said units comprising an arm adapted to swing laterally with reference to one of said units, bearing means connecting said arm to said latter unit comprising two bearing members having contacting bearing surfaces disposed at an angle to the pivotal axis of the bearing, one of said members being secured to and movable with the arm, and means to hold the arm connected with said one unit.

6. In a multiple row lister cultivator, the combination of two lister cultivator units, stabilizing means connecting said units comprising a transversely extending stabilizing bar and a stabilizing arm connected to said bar and adapted to swing laterally with reference to one of said units, bearing means for connecting said stabilizing arm to said latter unit comprising a bearing member carried by said cultivator unit and a bearing member carried by said stabilizing arm, said bearing members having cooperating bearing surfaces spaced laterally from the pivotal axis of said bearing means and disposed substantially at right angles to said axis, and means to hold said bearing members together.

7. In a lister cultivator, the combination of a cultivator unit and stabilizing means therefor comprising a stabilizing bar, an arm movably connected with said bar and including an end extending at right angles to the arm, journal means carried by said unit and receiving said end, a pair of bearing members one associated with said unit and the other associated with said arm and providing two relatively movable cooperating bearing surfaces, and means maintaining said end of the arm in said journal means whereby said bearing surfaces are maintained in cooperative relation.

8. In a lister cultivator, the combination of a cultivator unit and stabilizing means therefor comprising a stabilizing bar, an arm movably connected with said bar and provided with a downturned end, vertical journal means carried by said unit and receiving said downturned end providing for pivotal movement of said arm relative the cultivator unit about a substantially vertical axis, means to reenforce said journal means and downturned end against lateral stresses including cooperating bearing surfaces, one carried by said unit and the other carried by said arm, said surfaces extending outwardly from said pivot axis, and means associated with said surfaces for maintaining them in contact.

9. In a lister cultivator, the combination of two lister cultivator gangs, a transversely extending stabilizing bar, stabilizing arms connected to the end portion of said bar, and bearings connecting said stabilizing arms with said cultivator gangs, each of said bearings comprising a bearing socket carried by its gang, the associated arm having a downwardly extending bearing portion at the end engaging in said bearing socket, a plate secured to said cultivator gang, said plate having edges curved concentrically with the pivotal axis of said bearing socket, and means including bearing arms extending from said arm and engaging over the curved edges of said plate.

10. In a lister cultivator, the combination of two lister cultivator gangs, a transversely extending stabilizing bar, stabilizing arms connected to the end portions of said bar, and bearings connecting said stabilizing arms with said cultivator gangs, each of said bearings comprising a bearing socket carried by its gang, the associated arm having a downwardly extending bearing portion at the end engaging in said bearing socket, a plate secured to each of said cultivator gangs, said plate having edges curved concentrically with the pivotal axis of said bearing socket, a collar mounted on each of said stabilizing arms, and bearing arms extending from said collar and engaging over the curved edges of said plate.

11. In a lister cultivator, the combination of two lister cultivator gangs, a transversely extending stabilizing bar, stabilizing arms connected to the end portions of said bar, and bearings connecting said stabilizing arms with said cultivator gangs, each of said bearings comprising a bearing socket carried by its gang, a downwardly extending bearing portion at the end of said stabilizing arm engaging in said bearing socket, a plate secured to said cultivator gang, said plate having edges curved concentrically with the pivotal axis of said bearing socket, a collar mounted on said stabilizing arm, bearing arms extending radially from said collar and having hook-like end portions embracing the curved edges of said plate, and a clamping arm extending from said collar and to which said stabilizing arm is secured.

12. In a lister cultivator, the combination of a cultivator unit and stabilizing means therefor comprising a stabilizing bar, an arm movably connected with said bar, bearing means movably connecting said arm with said unit comprising a plate member secured to said unit and a second arm connected with said first arm and movable over said plate, and means for maintaining said plate and second arm in cooperating relation.

13. In a lister cultivator, the combination of a cultivator unit and a stabilizing means therefor comprising a stabilizing bar, a stabilizing arm movably connected with said bar adjacent one end, bearing means movably connecting the other end of said stabilizing arm with said unit and including a substantially flat plate member and an arm member movable thereover and including a portion embracing said plate member on both sides thereof, one of said members being rigidly connected with said unit and the other bearing member being rigidly connected with said stabilizing arm.

14. In a lister cultivator, the combination of a cultivator unit and stabilizing means therefor comprising a transverse stabilizing bar, a stabilizing arm movably connected therewith, and bearing means movably connecting said stabilizing arm with said cultivator unit for relative movement in a substantially horizontal plane, said bearing means comprising a substantially flat plate member and a second member movably associated therewith and formed to embrace said plate member at a pair of spaced points thereon, one of said members being carried by said unit and the other of said members being carried by said stabilizing arm.

15. In a lister cultivator, the combination of a cultivator unit and stabilizing means therefor comprising a stabilizing bar extending substantially transversely of the unit, a stabilizing arm movably connected with said bar and extending forwardly therefrom, bearing means movably connecting the forward end of said stabilizing arm with said cultivator unit and comprising a substantially flat plate member rigidly carried by said unit and a relatively rotatable bearing member movable over said plate member, said bearing member comprising outwardly extending portions and a portion formed to receive the forward end of said stabilizing arm, and means associated with said members for maintaining them in bearing engagement.

16. In a lister cultivator, the combination of a cultivator unit and stabilizing means therefor comprising a stabilizing bar, a stabilizing arm movably connected with said bar, and bearing means movably connecting said arm with said unit, said bearing means comprising a substantially flat plate carried by said unit, means establishing a pivot connection between the stabilizing bar and said unit, bearing arms extending from said stabilizing arm and movable over said plate in bearing engagement therewith, and means including a clamping arm connected with said bearing arms for securing the latter to said stabilizing arm.

17. In a lister cultivator, the combination of a cultivator unit and stabilizing means therefor comprising a stabilizing bar, a stabilizing arm movably connected with said bar, bearing means movably connecting said arm with said unit, said bearing means comprising a substantially flat plate secured to said cultivator unit, and a pair of bearing arms extending outwardly from said stabilizing arm and movable over said plate in cooperative bearing engagement therewith, said bearing arms serving as stops to limit the relative movement between said stabilizing arms and the cultivator unit.

18. In an agricultural implement having a frame member and an arm journaled thereon, bearing means therefor comprising a substantially flat plate member connected with said frame member, a relatively rotatable bearing member movable over said plate member and connected with said arm, said bearing member comprising outwardly extending portions and a portion formed to receive said arm, and means associated with said plate member and bearing member for maintaining them in bearing engagement.

19. In an agricultural implement having a frame and an arm journaled thereon, bearing means therefor comprising a substantially flat plate secured to said frame, a pair of bearing arms extending radially outwardly from said first mentioned arm and movable over said plate in cooperative bearing engagement therewith, and means carried by said frame and cooperating with said bearing arms whereby the latter serve as stops to limit the relative movement between the first mentioned arm and the frame.

20. In an agricultural implement, a laterally rigid bearing construction for connecting relatively movable members, said bearing construction comprising a plate member connected with one of said members and extending radially with respect to the axis of movement between said members, a pair of arms connected with the other of said members and extending radially therefrom, and means at the ends of said arms for engaging the edges of said plate.

21. In an agricultural implement, a bearing construction for a pair of pivotally connected members, said construction comprising an elongated sleeve rigidly connected with one of said members and adapted to receive the other of said members journaled therein, a laterally extending plate connected with said first member, and radially extending arm means connected with the other of said members and adapted to be held in engagement with the peripheral portions of said plate.

22. In an agricultural implement, a bearing construction for rotatably connected members, said bearing construction comprising an elongated sleeve member secured to one of said rotatably connected members, a laterally extending plate member rigidly connected with said sleeve member, the other of said rotatably connected members being journaled for rotation in said sleeve member, and at least one arm rigidly connected with said journaled member and extending laterally therefrom and provided with means engaging said plate member in interlocking relation.

23. In an agricultural implement, a bearing socket, an arm having a downwardly extending bearing portion journaled in said bearing socket, a laterally extending plate member rigidly connected with said socket, said plate having edges curved concentrically with respect to the pivotal axis of said bearing socket, and means including at least one bearing arm extending laterally from said first mentioned arm and engaging the curved edge of said plate member.

24. In an agricultural implement, a bearing socket, an arm having a bearing portion journaled in said socket, a plate member secured to said bearing socket and having edges curved concentrically with respect to the pivotal axis thereof, a collar mounted on said arm, laterally disposed bearing members extending radially from said collar and having hook-like end portions embracing the curved edges of said plate member, and means rigidly connecting said collar with said arm.

WALTER H. SILVER.